July 5, 1960
C. E. WILLIS ET AL
2,943,606
SERVO ACTUATOR ADAPTED TO BE OPERATED
BY A PLURALITY OF CONTROL SIGNALS
Filed Dec. 3, 1956
4 Sheets-Sheet 1
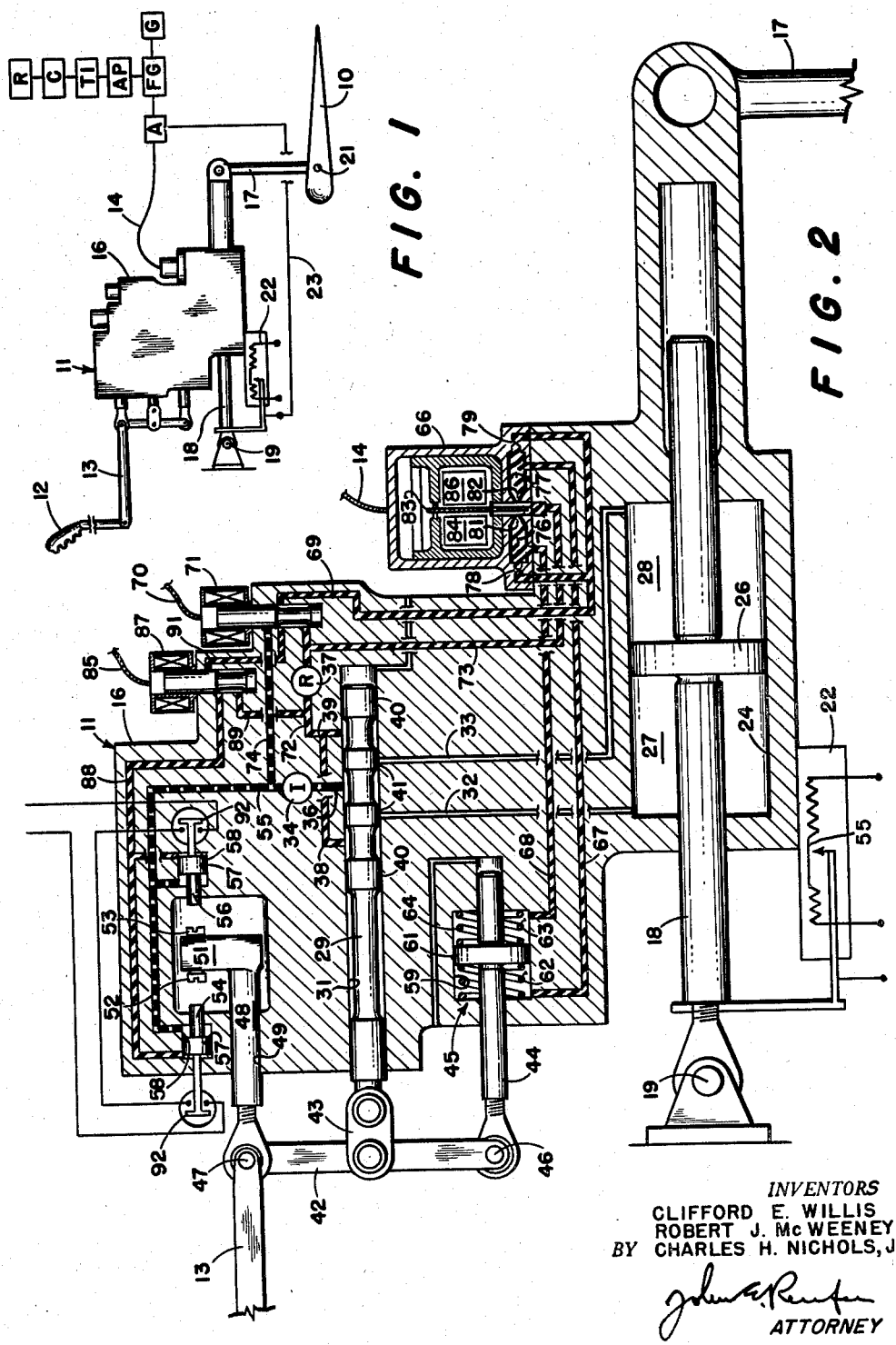
INVENTORS
CLIFFORD E. WILLIS
ROBERT J. McWEENEY
BY CHARLES H. NICHOLS, JR.
ATTORNEY

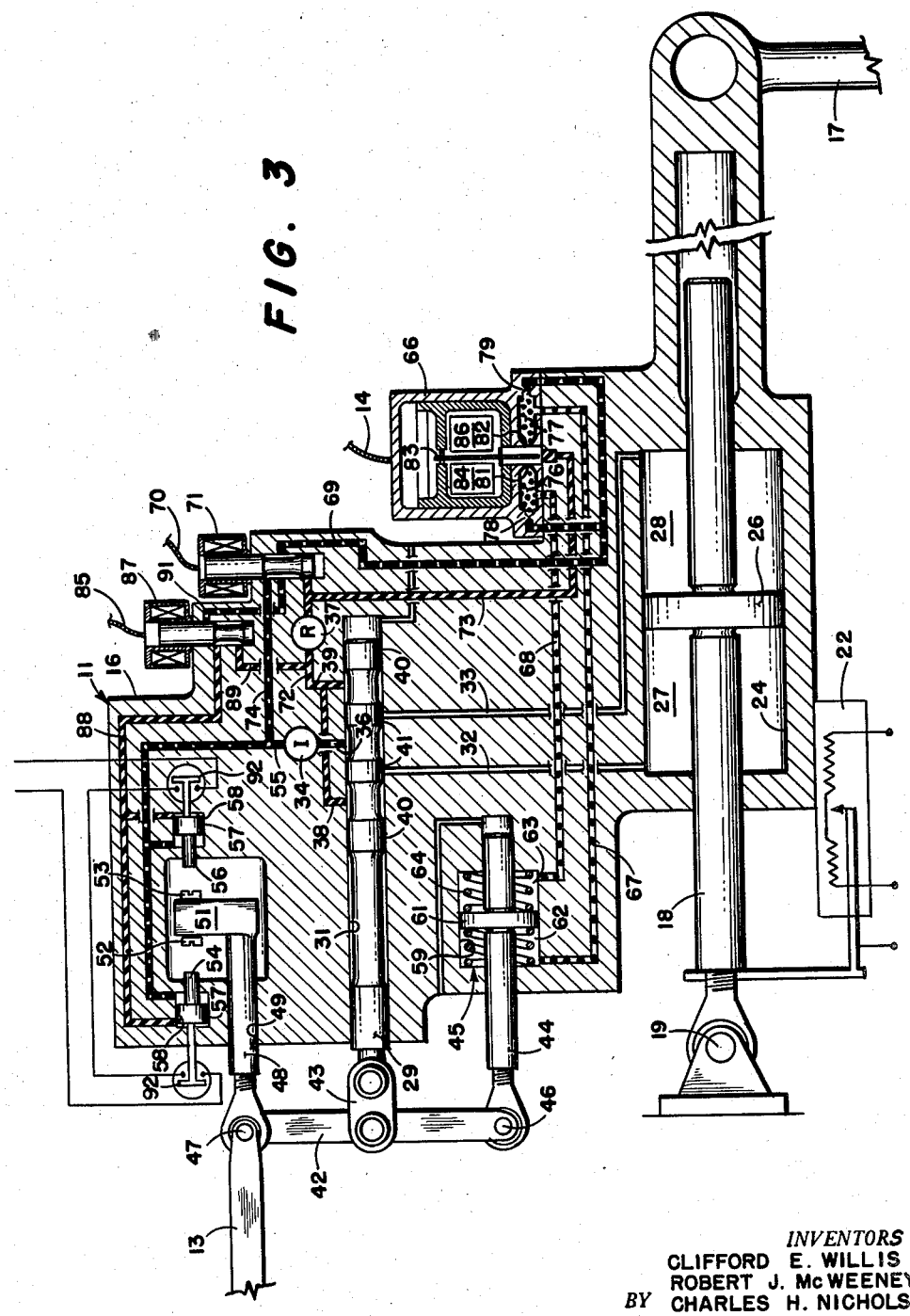

July 5, 1960

C. E. WILLIS ET AL 2,943,606

SERVO ACTUATOR ADAPTED TO BE OPERATED
BY A PLURALITY OF CONTROL SIGNALS

Filed Dec. 3, 1956

INVENTORS
CLIFFORD E. WILLIS
ROBERT J. McWEENEY
BY CHARLES H. NICHOLS, JR.

ATTORNEY

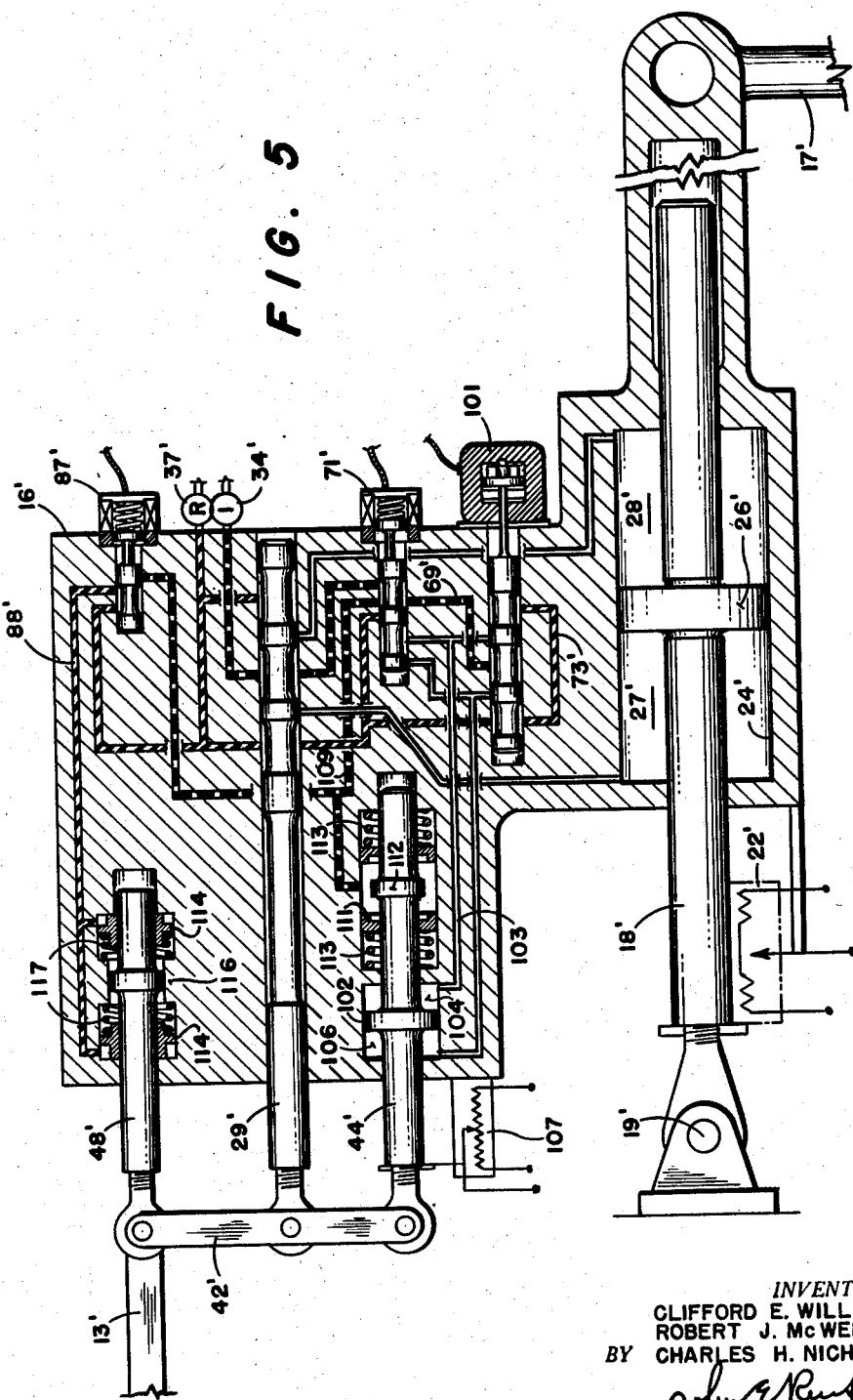

United States Patent Office 2,943,606
Patented July 5, 1960

2,943,606

SERVO ACTUATOR ADAPTED TO BE OPERATED BY A PLURALITY OF CONTROL SIGNALS

Clifford E. Willis, Robert J. McWeeney, and Charles H. Nichols, Jr., Kalamazoo, Mich., assignors to Cleveland Pneumatic Industries, Inc., Cleveland, Ohio, a corporation of Ohio Filed Dec. 3, 1956, Serial No. 625,870

8 Claims. (Cl. 121—41)

This invention relates to a servo-type control apparatus and more particularly to a type thereof for controlling a mechanical element in response to all or any part of a plurality of controlling signals. A particular application of the invention lies in the movement of a control surface of an aircraft in response to signals from any one or all of the manual stabilizing means controlled by the pilot or such automatic direction controlling means as an auto-pilot, roll, yaw and pitch stabilizers, or a target follower.

Since servo-type mechanisms have a multitude of uses, it will be appreciated that apparatus embodying the present invention is subject to a wide variety of specific use applications. However, the particular forms of the apparatus disclosed herein for illustration purposes were developed primarily for use with an aircraft. Thus, both the objectives of the invention and the particular manner of operation of the described apparatus are best illustrated by their application to aircraft. Accordingly, the following description will proceed primarily in terms of the application of the invention to the controlling of aircraft, but it will be clearly understood throughout that such specific reference is by way of illustration only and is not limiting. Further, the device being subjected to control by the apparatus of the invention could as well be a mechanical valve, the slider of a potentiometer, an indicator for some type of visual signaling mechanism, a cam whose position controls other apparatus and many other devices too numerous to mention.

Referring to the control of an aircraft for purposes of illustration, it has for a long time been common to effect the movement of a selected one of the controlling surfaces of an aircraft by a plurality of devices, each responsive to a particular controlling signal. Sometimes the controlling signal is mechanically initiated by the pilot through his manually responsive controls, sometimes it is originated by an auto-pilot, sometimes it is originated by a stabilizing gyroscope, and sometimes it is originated by a target following device, such as a radar controlled device. At other times the signals may be originated concurrently by any combination of these devices. All of such control devices normally operate through independent servo mechanism of one type or another and it has been customary in the past to join the mechanical outputs of a plurality of such independent servo mechanisms, each thereof being controlled by one of the controlling devices or functions above indicated, in order to apply a single, or summated force upon the surface. This has operated well enough, but it has been subject to the disadvantage that a plurality of servo mechanisms have been required, at least one usually being required for actuation by each of the signal originating functions, and this imposes severe space and weight requirements upon the aircraft. Since both space and weight possibilities in an aircraft are limited, serious and vigorous efforts have been made in the past to reduce the space and weight requirements of these servo mechanisms, but, insofar as we are aware, no appreciable progress to that end has been made.

In approaching the problem, the present invention departs from the previous concept of joining the mechanical outputs of the several, individually controlled servo mechanisms, and instead utilizes only a single servo mechanism for each surface controlled and joins the several controlling signals immediately prior to the signal input of said single servo mechanism. Thus, the several signals, either individually or grouped, can be fed simultaneously to the input of a single servo mechanism and the mechanical output of said single servo mechanism is then applied to the control surface concerned. Thus a single servo mechanism replaces the multiplicity of such mechanisms previously used with the result that the space and weight requirements imposed on the airplane by the surface control mechanisms are materially reduced.

A further problem in providing a control device of this general type lies in the fact that it is desirable for certain of the automatic controls to transmit their operation back through the pilot's controls. For example, the stabilizing controls are of a rapidly and continuously acting nature so that were the pilot's manual controls to respond to, and indicate, each of the stabilizing forces applied to the control surfaces, there would be a constant oscillation of the controls which would give the pilot no helpful signal but would merely create a source of irritation. Hence, it is in general, desirable for the stabilizing apparatus to act solely on the control surfaces of the airplane without reflecting the movements resulting therefrom to the pilot's control. This type of control wherein the movement resulting therefrom is not reflected back to the pilot will be designated as series control. On the other hand, when the automatic pilot applies direction and attitude controlling signals to the aircraft surfaces, it is helpful for the pilot if the controls follow such movements. Thus, if the pilot wishes to reassume control over the aircraft, his control will normally resume in a position corresponding to the attitude and direction of the airplane at the moment the pilot reassumes the control rather than in some other, not necessarily corresponding, position. This type of control wherein the movement is reflected in the pilot's manual controls will hereinafter be referred to as parallel control. The series type is also referred to as a differential type wherein the signals from the manual control and stabilization system are algebraically summed, as contrasted to the parallel type wherein the signal is of the command type and does not include an algebraic summation as aforementioned.

Thus, it is not only desirable for the input signals to operate either individually or in groups on the single controlling servo mechanism, which produces a single mechanical output, but it is also desirable for certain input signals to be so inter-related as to affect each other and for others of the input signals to be so isolated as not to affect each other.

Accordingly, a principal object of this invention is to provide a servo-type mechanism capable of supplying a single mechanical output in response to all or part of a plurality of irregularly and independently acting control signals.

A further object of this invention is to provide a servo-type mechanism, as aforesaid, particularly adapted for use in aircraft and wherein one of the control signals may be provided by the pilot.

A further object of this invention is to provide a device, as aforesaid, in which one of the control signals may be provided by the pilot and other controls signals may be provided by automatic apparatus, and the pilot is able at any time to override the signals imposed by the automatic control apparatus.

A further object of the invention is to provide a servo-type mechanism, as aforesaid, in which selected ones of the automatic signals will be transmitted back through the pilot's control in order that he may feel the result of such automatic signals, and others of such automatic signals are not transmitted back through the pilot's control in order that he will not feel the results of these A further object of the invention is to provide a servo mechanism, as aforesaid, which will materially reduce, as compared to previous practice, the space and weight requirements for apparatus and which is responsive to a plurality of input signals for controlling the movement of a single output mechanism.

A further object of the invention is to provide a device the mechanical structure of which will be of sufficient simplicity as to be capable of economical fabrication and easy maintenance.

A further object of the invention is to provide a device, as aforesaid, applicable to a wide variety of specific service situations.

A further object of the invention is to provide a device, as aforesaid, wherein one of the input signals, such as those produced by the manual control of the pilot, is capable at will of overriding the control exercised by any or all of the other control functions.

Further objects and advantages will appear from the following description and drawings, wherein:

Figure 1 is a schematic illustration of an actuator according to the invention shown as it would be installed with the remaining elements of the control system.

Figure 2 is a schematic longitudinal section of a preferred actuator according to this invention capable of both series and parallel operation showing the operating condition when both of the automatic series and parallel controls are shut off and the actuator is used only for power operation in response to the pilot's manual control signals.

Figure 3 is a view similar to Figure 2 showing the operating condition of the actuator when it operates to provide power operation in response to the pilot's manual control and automatic series control.

Figure 4 is a view similar to Figure 2 showing the operating conditions of the actuator when it is arranged for series, parallel, and manual pilot control; and, Figure 5 is a schematic longitudinal section of another embodiment of an actuator according to this invention.

Referring to Figure 1, the entire control system is schematically shown wherein 10 designates a control survace of an aircraft which must be operated by a servo actuator 11. The control surface can be of any of the control surfaces of the aircraft which are to be moved to control the aircraft flight. A pilot's control stick or control signal 12 is connected to the actuator 11 by a linkage 13 and the various automatic electrical devices are connected to the actuator by an electrical connector 14. The automatic electrical control mechanism may include a radar unit R, a computer unit C, a tie-in unit TI, and an automatic pilot AP. The output signals of these units along with the output signal of the stabilizing system such as a gyro G are normally fed into a function generator FG wherein the various signals are summed to produce a single composite electrical signal. The output of the function generator FG is supplied to an amplifier A which in turn is connected to the actuator 11 by the connection 14.

The actuator body 16 is connected to the control surface 10 through a link 17 and the actuator piston rod 18 is connected to a suitable pivot 19 on the frame of the aircraft. Therefore, relative movement between the actuator body 16 and the piston rod 18 causes the control surface 10 to turn around its pivot 21 on the frame of the aircraft. A potentiometer or feedback device 22 is connected between the body 16 and the piston rod 18 produce an electrical signal which is a function of the relative position between these two elements. The output signal of the potentiometer is fed into the amplifier A through an electrical connection 23 so that the output signal from the automatic units can be compared with the potentiometer signal to determine whether or not the actuator has moved to the proper position called for by the automatic mechanism. The output signal of the amplifier which reaches the actuator 11 through the electrical connection 14 is a result of this comparison so that the signal reaching the actuator is only that signal which is necessary to provide the corrective movement called for by the automatic mechanisms.

Referring to Figure 2 the actuator body 16 is formed with a cylinder 24 through which the piston rod 18 projects and a piston head 26 on the piston rod 18 divides the cylinder 24 into a first chamber 27 and a second chamber 28. If fluid under pressure is introduced into the chamber 27 a force reaction is developed which moves the actuator body 16 to the left relative to the piston rod 18 and if the fluid under pressure is introduced into the chamber 28, the actuator body 16 moves to the right. A control valve or energy input control having a spool 29 is positioned within a bore 31 in the actuator body 16 and fluid passages 32 and 33 connect the bore 31 to the chambers 27 and 28 respectively. An inlet port 34 which is supplied with fluid under pressure from a source of pressure (not shown) is connected to the bore 31 by a passage 36 and a reservoir return outlet port 37 is connected to the bore 31 by passages 39 and 38. In Figures 2 through 5, heavy block cross hatching in the fluid passages indicate that these passages are in communication with the inlet port 34 and therefore under pressure and heavy diagonal crosshatching in the fluid passages indicate that these passages are in communication with the outlet port 37 which is connected to the reservoir return. The spool 29 is formed with valve lands 41 which are positioned to close the passages 32 and 33 when the spool is in the neutral position shown, and remote lands 40 which prevent leakage of fluid out along the bore 31.

If the spool moves to the right the lands 41 are moved to a position wherein the passages 32 and 33 are uncovered so the passage 32 is brought into fluid communication with the passage 38 and the passage 33 is brought into fluid communication with the passage 36. Therefore, movement of the spool 29 to the right causes fluid communication to be established between the inlet 34 and the chamber 28 and at the same time fluid communication is established between the chamber 27 and the outlet 37. Therefore, movement of the spool to the right causes the chamber 28 to be pressurized and results in movement of the actuator body 16 to the right. If the spool 29 is moved to the left, the opposite connections are made and the chamber 27 is connected to the inlet 34 while the chamber 28 is connected to the outlet 37. Therefore, movement of the spool to the left from its neutral position causes movement of the actuator body 16 to the left. Within the limits of the spool design the rate of flow and in turn the rate of actuator movement is a function of the relative movement between the spool 29 and the actuator body 16, because greater movement causes the passages 32 and 33 to be opened wider.

Two means are provided to cause movement of the spool 29 from its neutral position. The first is the linkage 13, capable of moving the spool 29 through a bar 42 which is pivotally connected to a floating link 43 and a piston rod 44 and the second, which is a control or servo cylinder 45, of which the piston rod 44 is a part. A pivotal connection at 47 connects the linkage 13 and bar 42 to a stop member 48 which is slidable in a bore 49 formed in the actuator body 16. The floating link 43 is pivotally connected to the spool 29 to provide for the operation thereof in response to movement of either the piston rod 44 or the linkage 13.

Assuming that the piston rod 44 remains stationary, movement of the linkage 13 to the left causes rotation of the bar 42 in a counterclockwise direction around its pivot 46 and the piston rod 44 which in turn moves the spool 29 to the left through its connection with the floating link 43. Therefore, movement of the linkage 13 to the left will cause the actuator to operate and move the actuator body 16 to the left. Movement of the linkage 13 in the opposite direction, namely to the right, moving the spool 29 to the right and causes the actuator body 16 to move to the right. In either case, the movement of the actuator body 16 will be a function of the movement of the linkage 13 so an automatic servo system results. This is due to the fact that movement of the linkage 13 to the right or left pivots the bar 42 around the pivot 46 and initiates movement of the body 16 in the same direction. As soon as the actuator body 16 commences to move, the pivot 46, which is carried thereby will move in the same direction as the linkage 13. This will return the bar 42 to its original orientation and therefore move the spool 29 back to the neutral position as soon as the actuator body has moved the same distance as the linkage 13. Those skilled in the art will, therefore, recognize that the actuator body 16 will be moved by fluid flow through the same distance as the linkage 13 in the same direction and will automatically stop its motion by returning the spool 29 to its neutral position when the proper amount of motion has taken place. Therefore, the connection of the linkage 13, bar 42 and piston rod 44 serves as an automatic feed back to relate the actuator movement to the movement of the linkage 13.

The right hand end of the stop member is formed with a lateral projecting portion 51 into which is threaded adjustable stop screws 52 and 53. These stop screws are arranged to engage the ends of the stop plungers 54 and 56 respectively to limit the travel of the stop member 48 relative to the actuator body 16. The stop plungers 54 and 56 are each formed with piston portions 57 operated within small cylinder cavities 58. Fluid under pressure is always supplied to the side of each piston portion 57 adjacent to the corresponding stops 52 and 53 through a passage 55 so the plungers normally assume the position shown which is their retracted position. Therefore, the maximum possible free travel of the stop member 48 is the amount shown in Figure 2. It, therefore, follows that when the elements are in the position shown in Figure 2, the maximum allowable movement of the linkage 13 relative to the actuator body is provided.

The servo cylinder 45 includes the piston rod 44, which extends through a cylinder cavity 59, formed in the actuator body 16 and is provided with a piston head 61 mounted thereon. The piston head 61 divides the cylinder cavity into a first chamber 62 and a second chamber 63. Centering springs 64 are positioned on both sides of the piston head 61 to resiliently retain the piston head 61 in its neutral position shown if the pressures of the fluid on both sides of the piston head are equal. Therefore, these springs tend to hold the piston rod in its neutral position and fix the pivot 46 relative to the actuator body 16.

The chambers 62 and 63 are connected to opposite sides of a differential valve 66 by passages 67 and 68 respectively. The differential valve 66 is of the type which produces a differential pressure that is a function of an electrical signal supplied to the valve from the amplifier A through the electrical connection 14 as hereinafter described. Therefore, the differential pressure in the passages 67 and 68 is a direct function of the electrical signal supplied from the amplifier A. A passage 69 connects the differential valve 66 to a solenoid operated series valve 71. The series valve 71 is connected to a switch (not shown) in the pilot's compartment by a conductor 70. When the series valve 71 is in its normal or de-energized position the passage 69 is connected to the outlet 37 through a passage 72. A second passage 73 connects the center of the differential valve 66 to the passage 72 directly so that the center portion of the valve 66 is always in communication with the outlet 37. When the series valve 71 is de-energized, as shown in Figure 2, the actuator cannot be operated by a signal from the amplifier A and, therefore, only a manual control signal from the pilot's control through the linkage 13 can cause operation.

When the series valve 71 is energized by the pilot, the passage 69 is brought into communication with a passage 74 so that fluid communication is provided between the inlet 34 and opposed controlling cavities 76 and 77. At the same time, the passage 69 is isolated from the passage 72. (See Figure 3.) Control cavities 76 and 77 in the differential valve 66 are connected to the inlet port 34 through restricted orifices 78 and 79 respectively and are provided with exhaust orifices 81 and 82 connected on their exhaust side to the passage 73 and thus to the outlet 37. Positioned between the exhaust orifices 81 and 82 is a deflector vane 83 which is normally in a mid-way position. When the vane 83 is in its midway position, an intermediate pressure will be maintained within the two cavities 76 and 77 wherein the pressures in the two chambers are equal since equal flow will be passing therethrough. In the drawings, a circular symbol is used in the passage 67 and 68 to indicate that these passages are at an intermediate pressure when the series valve 71 is energized. This intermediate pressure is lower than the inlet pressure and higher than the outlet pressure, and its value is determined by the pressure drops which occur due to the flow of liquid through the orifices 78 and 78 and exhaust orifices 81 and 82. If the deflector vane 83 is moved either to the right or left, it causes a change in the intermediate pressure of the cavities 76 and 77, in that movement of the vane 83 to the left tends to restrict the flow out of the orifice 81 and permits a less restricted discharge from the orifice 82. This will cause a build up of pressure within the cavity 76 and a decrease in pressure in the cavity 77. Movement of the vane in the opposite direction will cause the pressure in the cavity 77 to increase and the pressure in the cavity 76 to decrease. Very slight amounts of movement of the vane will therefore produce satisfactory differential pressures between the two cavities 76 and 77. The differential valve 66 is provided with electro magnets 84 and 86 which cause the deflections of the vane 83 so the differential pressure produced by the valve 66 is a function of the control signal from the amplifier A.

The cavity 76 is connected to the chamber 63 by the passage 68 and the cavity 77 is connected to the chamber 62 by the passage 67 so that the two chambers 62 and 63 are subjected to the same differential pressures as the cavities 76 and 77. When there is a differential between the pressures in the cavities 62 and 63, a proportional force will be developed on the piston head 61. This force will move the piston head 61 in a direction away from the chamber having the higher pressures against the centering force of the springs 64. When sufficient movement of the piston has taken place to cause the springs 64 to balance the force resulting from the differential pressure, the piston head 61 will come to rest. Therefore, the amount of displacement of the piston head 61 from the neutral position is a function of the differential pressure which is in turn a function of the control signal from the amplifier A.

Movement of the piston head 61 to the right, of course, moves the piston rod 44 and the pivot 46 to the right. Assuming now that the pivot 47 is stationary, such movement will cause the spool 29 to move to the right and in turn cause the actuator body 16 to move to the right as previously described. Such movement of the actuator body 16 causes further movement of the pivot 46 to the right with respect to pivot 47, but the pivot 46 maintains the same displacement relative to the actuator body 16 as was caused in the aforementioned manner by the action of the differential valve 66. This further displacement of the pivot 46 relative to the pivot 47 results in an additional increment of the spool 29 displacement to the right relative to the pivot 47. The latter increment of displacement of the spool 29 is not equal in magnitude to the actuator body 16 displacement because of the geometry of the link 42; the spool 29 displacement being less than the actuator body 16 displacement. Since the spool 29 displacement is less, it is evident that continual movement of the actuator body 16 will cause the relative displacement of the spool 29 to the actuator body 16 to decrease until the neutral position of the spool is reached. In this neutral position, shown in Figure 3, passages 32 and 33 are closed by lands 41 so that there is no communication of fluid to cavities 27 or 28 and the actuator body 16 comes to rest. Thus it is shown that the unit possesses inherent feedback whereby the amount of displacement of actuator body 16 is a function of the mechanical geometrical design of linkage 42. Since the displacement of piston 44 is controlled by the magnitude of the electrical signal to the differential valve 66 and since the displacement of the piston 44 results in a displacement of actuator body 16 of a predetermined magnitude as aforementioned, those skilled in the art will, therefore, recognize that the displacement of the actuator body 16 may be controlled by the magnitude of the electrical signal to the differential valve 66. During such movement, the stops 52 and 53 are normally not in engagement with the stop plungers 54 and 56 so the pivot 47 will not be moved and the pilot will not be aware of the movement of the actuator body 16. This is the series operation previously mentioned wherein the pilot is not aware of the movement of the actuator created by the automatic electrical equipment.

In a normal aircraft installation, the series control is provided for flight stabilization. In many aircraft, it is necessary to constantly provide a small correcting control movement to maintain the aircraft in stable flight. This stabilizing control normally originating in the gyroscope G or other stabilizing devices does not require the full range of possible control movement, so that the actuator movement in response to such signals is not sufficient to cause the stops 52 and 53 to engage the plungers 54 and 56, particularly when the plungers are retracted.

When the automatic pilot AP, or any other of the mechanisms which are used to control the direction of flight is controlling the aircraft, it is desirable that the control movement be transmitted to the pilot. In such cases, the pilot is not guiding the controls, but his controls follow the movement of the control surfaces. Such devices have the ability or authority to operate the controls through the full range of control movement and in such cases parallel control is provided. To that end, a normally closed electrical solenoidally operated parallel control valve 87 is energized by the pilot through an electrical conductor 85 when the automatic flight control such as the automatic pilot AP, radar R, and the like are used to control the aircraft. This valve is arranged so that the passage 88, which communicates with the sides of the piston head 57, remote from the adjacent stops 52 and 53 are in communication with the outlet 37 through a passage 89 when the valve 87 is not energized. When the valve 87 is energized or moved to the open position, the passage 88 is isolated from the passage 89 and brought into communication with a passage 91 which connects to the series control valve 71. The series control valve 71 connects the passage 91 to the outlet 37 when it is in the off or closed position so that if the parallel valve 87 is operated when the series valve 71 is closed, there is no change but if both the series valve and the parallel valve 87 are operated at the same time, the passage 88 is connected to the inlet 34 through the passage 91, the valve 71, and passage 74. This is the position of the elements shown in Figure 4, wherein the elements are in position for both parallel and series operation.

For parallel operation, pressure fluid is supplied from the inlet 34 to both sides of the pistons 57. However, the sides of the pistons 57 remote from the plungers 54 and 56 have a larger effective area than the sides adjacent to the plungers because the adjacent sides are reduced by the area of the plungers 54 and 56. Therefore, the pistons move inward toward the adjacent stops 52 and 53 decreasing the amount of free movement between the stop member 48 and the actuator body 16. The remaining free movement is proportioned to provide sufficient free travel so that full operation of the flight stabilization will not cause the stops 52 and 53 to engage the plungers. Therefore, any flight stabilization signals will not create sufficient actuator movement to cause the adjacent stops 52 and 53 to engage and the corresponding plungers 54 and 56. As a result, movement of the actuator body 16 in response to the flight stabilization signals will not be transmitted back to the control signal 12. However, the position of the pilot's control stick or control signal 12 will correspond approximately to the position of the control surface 10 and if the automatic flight control produces a control signal in the amplifier A sufficiently large to cause movement of the actuator 16 to a point wherein one of the stops 52 and 53 engage their corresponding plungers 54 and 56 movement of the actuator in response to such control signal will cause the pilot's controls to move with the actuator.

When the pivot 47 moves with the actuator body 16 the bar 42 does not function as a feedback mechanism as described in connection with the series operation. Therefore, it is necessary to use the potentiometer 22 to supply the feedback signal which brings the system to rest when its movement is a proper function of the signal from the automatic controls. Therefore, during series parallel operation the potentiometer 22 is energized and produces a feedback signal which is a function of the movement of the actuator body 16. When the signal from the potentiometer 22 is equal and opposite to the signal from the function generator FG, they cancel and the resulting signal from the amplifier A supplied to the differential valve goes to zero. This will cause the vane 83 to return to the neutral position and equalize the pressures in the chambers 62 and 63. Since the springs 64 will then be unbalanced, the piston head 61 moves back to its neutral position, which in turn returns the spool 29 to its neutral position and thereby stops any further movement of the actuator body 16. Those skilled in the art will, therefore, recognize that the extent of movement of the actuator body 16 caused by the signals from the function generator FG will be a function of the magnitude of the signal from the function generator FG. It is recognized that the bar 42 will operate to produce limited feedback during the series portion of series parallel operation because such operation does not cause the stops 52 and 53 to engage the plungers 54 and 56. To prevent this from combining with the potentiometer 22, feedback to produce double feedback, we use a potentiometer 22 having a dead region 55 at the neutral which has a length corresponding to the free motion distance of the actuator body 16 relative to the pivot 47 during series parallel operation. The potentiometer 22, therefore, is ineffective in producing a feedback signal in this range and eliminates a double feedback. This method of eliminating double feedback is normally effective because most stabilization control occurs in level flight. However, it may be desirable to use a simple lost motion connection between the pointer of the potentiometer 22 and the piston 18 in some cases to eliminate double feedback over the entire range.

If at any time during the operation of the aircraft, the pilot wishes to override the automatic control, he merely moves the linkage 13. If he desires to make control movements sufficiently fast to cause movement of the plungers, he merely uses sufficient force to overcome the force holding the plunger 54 and 56, whichever the case may be, in its extended position. In either case, this causes greater movement of the spool 29 and in turn results in faster operation of the actuator.

Figures 2, 3 and 4, therefore, show the actuator under the various conditions of operation. In Figure 2, there is no automatic control but manual control is provided. When the series control valve 71 is operated as shown in Figure 3, the actuator is capable of providing both manual and series control while Figure 4 discloses both the series control valve 71 and the parallel control valve 87 in their operated position at which time the actuator can provide manual, series, and parallel control. Switches 92 are connected to the pistons 57 and are arranged to operate when the pistons move inward for parallel operation. These switches can be connected to signal lights in the cockpit to notify the pilot that the actuator is properly functioning for parallel control or can be connected between the various control actuators on the various control surfaces so that parallel flight control will not commence unless all of the actuators are ready for this type of operation.

In Figure 5, another embodiment of this invention is disclosed. In this embodiment, most of the elements correspond to the elements of the first embodiment, however, a torque motor operated valve 101 is used to produce movement of a piston 102, which corresponds to the piston head 61 of the previous embodiment. Where the various elements are essentially the same in function as corresponding elements of the previous embodiment similar reference numerals with a prime (') will be used.

The solenoid operated valve 101 is operated by the control signal from the amplifier to produce flow of fluid rather than a pressure differential as in the previous embodiment. When the valve is operated to the right, the passage way 69' is connected to a passage 103, which in turn connects to a chamber 104 on the right side of a piston head 102. At the same time, a chamber 106 on the left side of the piston head 102 is connected to a passage 73' by the valve 101. Since the passage 69' is open to fluid under pressure from the inlet port 34' when the series control valve 71' is operated as shown in Figure 5, fluid will flow into the chamber 104 and move the piston head 102 to the left. If the valve 101 is operated to the left, the chamber 106 is supplied with pressure fluid and the piston head 102 moves to the right. Here again there are two types of feedback operating in the same manner as the first embodiment. In this system, it is necessary to provide the additional potentiometer 107 so that the movement of the piston head 102 will be a function of the signal produced by the amplifier A. In the previous embodiment, differential pressures were created so this function relationship was produced without the use of the potentiometer 107.

When the series control valve 71' is in the "off" position, the passage 69' is connected to the outlet 37' and stop slides 111 are moved against the stop flange 112 and the piston rod 44' by springs 113 so that the piston rod 44' will be locked in its neutral position. When the parallel valve 87' is moving from the "off" position shown to the "on" position, the passage 88' is connected to the source which in turn moves stop members 114 inwardly against a shoulder 116 on the actuator body 16' against the force of springs 117. This limits the free travel of the stop members 48' to a small magnitude so that parallel operation will cause the pilot's control linkage 13' to move. The shoulder 116 is proportioned so that a limited amount of free travel is provided in the series parallel operation condition so that the type of control movement necessary for flight stabilization will not be fed back to the pilot and series operation will continue for this phase of the automatic control.

It can be seen in both embodiments a single actuator or power translating device can be used to operate the control surface 10 and this actuator will properly respond to all the different types of control signals. The pilot's manual control may be used to operate the input control or spool valve and in turn the actuator at any time. Electrical signals from any variety of automatic equipment can also cause operation of the actuator, through the same valve. The actuator is also able to distinguish between the type of signal used in flight stabilization originating in the gyroscope and the type used for automatic flight control originating from mechanisms such as the Automatic Pilot AP, Radar R, and the like. The small amplifier signals created by flight stabilization will not feed back to the pilot while the larger amplifier signals caused by the flight control mechanism appear in the pilot's controls. It should be understood that if flight control signals are small they will not be reflected by the pilot's controls but this does not cause difficulty since the position of the pilot's controls correspond approximately to the position of the flight surface.

Although preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are of the scope of the invention.

We claim:

1. A servo mechanism comprising a power translating device having power input means and a mechanical output element, an energy input control for said power translating device arranged to move from a predetermined position to control the speed and operation of said mechanical output element, manual control means connected to said input control effecting movement thereof, automatic control means connected for the actuation of said energy input control, first feed back means operating to restore said energy input control to said predetermined position in response to all movements of said output element by said manual control means and operating to restore said energy input control to said predetermined position in response to movement of said output element initiated by said automatic control means which are less than a predetermined amount, and second feed back means operating to return said input control to said predetermined position in response to movements of said output element initiated by said automatic control means which are greater than said predetermined amount.

2. A servo mechanism comprising a fluid motor including a movable output element, a control valve operably connected to said motor controlling the direction and speed of movement of said output element, a first control linkage operably connected to said valve for the actuation thereof in response to movement of said first linkage, a second linkage operably connected to said valve movable in response to a signal for the independent actuation of said valve, and means connecting said first linkage and output element effecting movement of said first linkage only when said output element moves under the influence of said second linkage beyond a predetermined range of position relative to said first linkage.

3. A servo mechanism comprising a fluid motor including a movable output element, a control valve operably connected to said motor controlling the direction and speed of movement of said output element, a first control linkage operably connected to said valve for the actuation thereof in response to movement of said first linkage, a second linkage operably connected to said valve movable in response to a signal for the independent actuation of said valve, and lost motion connecting means between said first linkage and output element permitting limited relative motion of said output element relative to said first linkage in response to movement of said second linkage.

4. A servo mechanism comprising a fluid motor including a movable output element, a control valve operably connected to said motor controlling the direction and speed of movement of said output element, a first control linkage operably connected to said valve for the actuation thereof in response to movement of said first linkage, a second linkage operably connected to said valve movable in response to a signal for the independent actuation of said valve, a lost motion connection between said first linkage and output element normally permitting a predetermined amount of relative movement therebetween when said output element moves in response to movement of said second linkage, and means included in said lost motion connection for reducing the free relative motion between said first linkage and output element to less than a predetermined amount.

5. A servo actuator comprising a first fluid motor having an output element movable in response to fluid under pressure, a control valve for said first motor regulating the direction and rate of movement of said output element, a differential pressure fluid motor having a movable member connected to said valve for the actuation thereof wherein the position of said movable member is a function of the differential in fluid pressure supplied thereto, electric feed back means connected to said output element producing a signal which is a function of the position thereof, an electric signal generating device, and electric differential pressure valve operated by the sum of all of said electric signals producing a differential pressure in said differential pressure motor which is a function of the sum of the control signals, a linkage connected to said control valve for the operation thereof independently of said differential motor, and a lost motion connection between said linkage and output element restricting movement therebetween in response to said signals to a predetermined amount.

6. A servo actuator comprising a first fluid motor having an output element movable in response to fluid under pressure, a control valve for said first motor regulating the direction and rate of movement of said output element, a second fluid motor having a movable member connected to said valve for the actuation thereof, an electric feed back connected to said output element producing a signal which is a function of the position thereof, an electric signal generating device, an electric valve operated by the sum of all of said electric signals regulating the position of said second motor and in turn the operation of said first motor, a linkage connected to said control valve for the operation thereof independently of said second motor, and stop means connected between said output element and linkage operable to limit the relative movement therebetween in response to said electric signals to a predetermined amount.

7. A servo actuator comprising a first fluid motor having an output element movable in response to fluid under pressure, a control valve for said first motor regulating the direction and rate of movement of said output element, a second fluid motor having a movable member connected to said valve for the actuation thereof, an electric feed back connected to said output element producing a signal which is a function of the position thereof, an electrical signal generating device, and electric valve operated by the sum of all of said electric signals regulating the position of said second motor and in turn the operation of said first motor, a linkage connected to said control valve for the operation thereof independently of said second motor, and stop means connected between said output element and linkage normally permitted only a predetermined amount of relative movement therebetween in response to said electric signals and operable to permit an amount of relative movement less than said predetermined amount.

8. A servo actuator comprising a fluid motor having an output element movable in response to fluid under pressure, a control valve connected to said motor operable to regulate the speed and direction of movement of said output element, a manual control connected to said control valve for the operation thereof, an automatic control connected to said control valve for the operation thereof, and lost motion means connected to said manual control normally moving said manual control valve in response to movement of said output element greater than a first predetermined magnitude when such movement is initiated by said automatic control and operable to move said manual control in response to movement of said output element greater than a second predetermined magnitude when said output element movement is initiated by said automatic control.

References Cited in the file of this patent

UNITED STATES PATENTS

| | | |
|---|---|---|
| 2,678,177 | Chenery | May 11, 1954 |
| 2,705,940 | Edwards | Apr. 12, 1955 |
| 2,738,772 | Richter | Mar. 20, 1956 |
| 2,766,731 | Brandes | Oct. 16, 1956 |
| 2,773,660 | Rasmussen | Dec. 11, 1956 |
| 2,777,285 | McDonald | Jan. 15, 1957 |
| 2,801,618 | Place | Aug. 6, 1957 |